(No Model.)
H. W. LIBBEY.
CAR WHEEL.
No. 492,907. Patented Mar. 7, 1893.
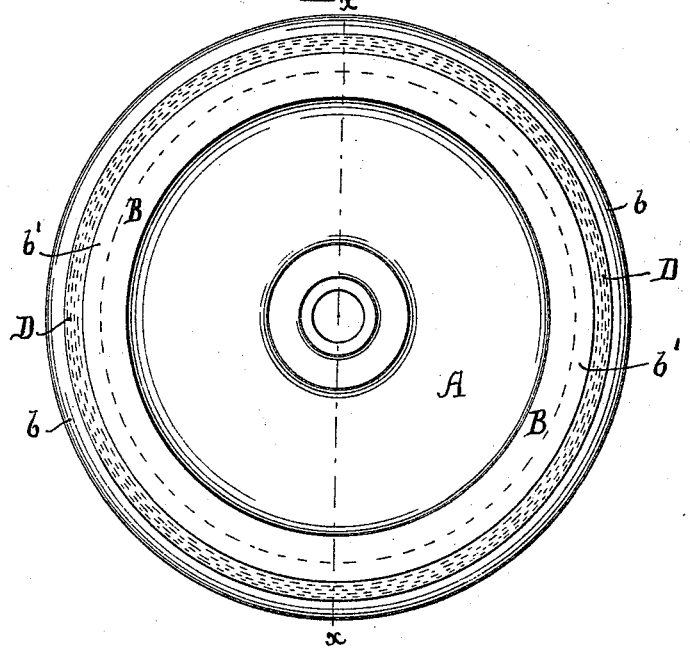
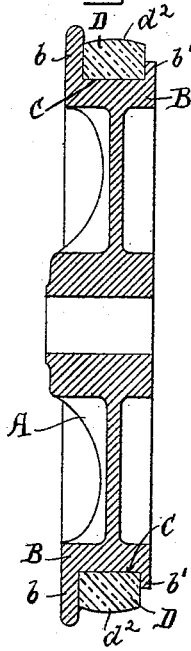
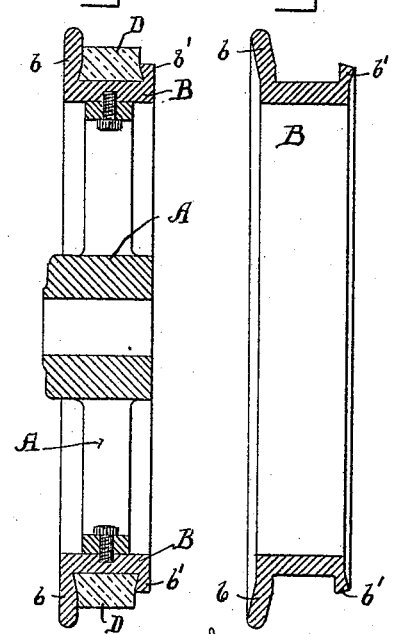
Witnesses.
Caleb H. Swan
George E. Hadley
Inventor
Hosea W. Libbey
by Edwin Stanta
Attorney

UNITED STATES PATENT OFFICE.

HOSEA W. LIBBEY, OF BOSTON, MASSACHUSETTS.

CAR-WHEEL.

SPECIFICATION forming part of Letters Patent No. 492,907, dated March 7, 1893.

Application filed October 27, 1891. Serial No. 409,987. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Car-Wheels, of which the following, taken in connection with the accompanying drawings, is a specification.

The object of my invention is to produce a street car wheel with an elastic tread and which will run noiselessly upon the rail, and at the same time have a greater adhesion and less friction than wheels with metal treads.

The invention consists of a street car wheel having an independent removable outer ring or tire provided with a groove around its periphery into which is inserted a ring of india rubber or its compounds, and also in the means for securing the said rubber ring in place.

Referring to the accompanying drawings: Figure 1—represents a side view of a street car wheel embodying my invention. Fig. 2—is a vertical section through the same, taken on line $x, x$, of Fig. 1. Fig. 3—is a similar section of the tire as rolled, and before the flanges have been bent to hold the india rubber ring. Fig. 4 is a similar view showing the india rubber ring with a rounded or convex face.

A, represents the body of the wheel which is of cast metal, and of any suitable form.

B, is the independent outer ring or tire which is formed with a dovetail groove C, around its periphery, one side or wall $b$, (forming the groove) is of greater depth than the other wall $b'$. The wall $b$, projects sufficient to form the flange that runs against the rail when the ring D, of india rubber or its compounds, is inserted in its place. The india rubber ring D, may have a flat tread as shown in Fig. 2, or it may be slightly rounded as shown at $d^2$, in Fig. 4.

In order to form the dovetail groove I first roll the tire as shown in Fig. 3, that is with the inner faces of the walls $b$, $b$, (which are to form the dovetail) at right angles to the face of the tire, the outer faces of said walls standing on an angle, after the tire is thus rolled, the walls $b$, $b$, are bent inward so that their outer surfaces are flush with the sides of the tire, and they stand as shown in Figs. 2 and 3 and form a dovetail groove into which an india rubber ring D, of corresponding form is forced and held.

It will be seen that a car fitted with wheels thus constructed will run noiselessly upon the rails, and at the same time will adhere to the rail so that there will not be any liability of slipping, and the car will ride smoothly thus obviating the jolting as in cars with wheels of ordinary construction thereby reducing the wear and tear.

What I claim is—

A car wheel having a body and an independent tire said tire being of metal rolled with a dovetail groove in its periphery, and a ring of india rubber of corresponding form inserted in said groove one of the walls $b$ of the groove projecting beyond the face of the rubber ring substantially as set forth.

In testimony whereof I have signed my name to this specification, in the presence of two subscribing witnesses, on this 28th day of July, A. D. 1891.

HOSEA W. LIBBEY.

Witnesses:
CHAS. STEERE,
EDWIN PLANTA.